3,433,805
WATER-SOLUBLE FLAVANOID DERIVATIVES
Josef Krämer, Klaus Irmscher, Darmstadt, and Herbert Halpaap, Jugenheim, Bergstrasse, and Karl-Otto Freisberg, Speyer (Rhine), Germany, assignors to E. Merck A.G., Darmstadt, Germany
No Drawing. Filed Jan. 27, 1966, Ser. No. 523,262
Claims priority, application Germany, Jan. 29, 1965, M 63,973
U.S. Cl. 260—340.5
Int. Cl. C07d 7/24, 95/00; A61k 27/00
14 Claims

ABSTRACT OF THE DISCLOSURE

Sulfuric and phosphoric acid esters of certain hydroxy-containing flavanoids for lowering the cholesterol blood level concentration.

---

This invention relates to water-soluble flavanoid derivatives.

An object of the invention is therefore to provide novel water-soluble flavanoid derivatives.

Another object is to provide one or more processes for the production of these derivatives, as well as novel intermediates therefor.

Additional objects include pharmaceutical compositions and methods of effecting therapeutic activities in mammals—based on the novel derivatives of this invention.

Upon further study of the specification and claims, other objects and advantages of the present invention will become apparent.

To obtain these objectives, there are provided sulfuric acid and phosphoric acid esters of hydroxyflavanoids of Formula I:

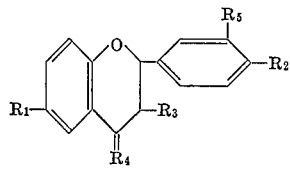

wherein $R_1$ and $R_2$ can be the same or different and represent OH, substituted alkoxy of 1–10 carbon atoms, unsubstituted alkoxy of 1–10 carbon atoms, acyloxy of 1–6 carbon atoms, $NO_2$, $NH_2$, alkylated $NH_2$ of a total of 1–8 carbon atoms, or acylamino of 2–6 carbon atoms;
$R_3$ is H, OH, alkyl or alkoxy of 1–6 carbon atoms, $NH_2$ or Hal;
$R_4$ is O or H, OH or H, H, or H, $NH_2$;
$R_5$ is H or $R_1$;
Hal is Cl, Br, or I;

wherein $R_2$ and $R_5$ together can also represent methylenedioxy, ethylenedioxy or propylenedioxy; wherein a double bond is optionally present in the 2,3-position; and with the provision that in the residues $R_1$ to $R_5$, at least one free hydroxy group must be present; and the salts of such esters of hydroxyflavanoids, preferably the alkali metal, alkaline earth metal, and ammonium salts.

These compounds exhibit, just as the corresponding parent compounds with a free OH— group, a cholesterol-level-lowering effect. Pharmacological tests were conducted on rats and young roosters. Moreover, these compounds are water-soluble and thus easily applicable, for example, they can be directly injected in an aqueous solution. With the water solubility, there is also combined a better resorbability in the body. The compounds also possess estrogenic, ovario-stimulating, antispasmodic and cardioactive effects.

Moreover, the blood cholesterol lowering effect of the esters according to the invention was compared with that of the corresponding parent compounds with a free OH—group according to the method of Counsell et al. (J. Med. Pharm. Chem. 5, 720, 1224 [1962]).

Normally fed rats were treated with 25 mg./kg. per os daily of the test substance for a period of 10 days. Thereafter, the animals were sacrificed, the serum cholesterol was determined colorimetrically and compared to that of the control animals. Surprisingly, it was found during these tests that in general the esters were substantially more effective than the corresponding hydroxy compounds.

The following figures are given by way of example (increase of serum cholesterol lowering effect caused by the test compound as compared to that caused by the parent hydroxy compound).

| Test compound: | Increase, percent |
|---|---|
| 3 - isobutyl - 6 - hydroxy - 4' - methoxyflavanone-6-sulfate, sodium salt | 600 |
| 3 - methoxy - 6 - hydroxy - 3',4' - methylenedioxy-flavane-6-sulfate, sodium salt | 190 |
| 3 - methyl - 6 - hydroxy - 4' - methoxy-flavone - 6-sulfate, sodium salt | 150 |
| Trans - 3 - ethoxy - 6 - hydroxy - 3',4' - methylenedioxyflavane-6-sulfate, sodium salt | 65 |
| 3 - n - propyl - 6 - hydroxy - 4' - methoxyflavanone-6-sulfate, sodium salt | 45 |
| 3 - methyl - 6 - hydroxy - 4' - methoxyflavanone - 6-sulfate, sodium salt | 22 |

The novel compounds can be produced by esterification of the compounds of Formula I with sulfuric acid, phosphoric acid, or a functional acid derivative thereof, i.e., a derivative of these acids suitable for esterification. It is likewise possible to conduct the reaction with a sulfuric acid or phosphoric acid derivative wherein one or two hydroxy groups, respectively, are protected. In the thus-obtained esters, the protective groups are then removed hydrolytically or hydrogenolytically. When compound I contains, in addition to hydroxy groups, further reactive moieties which can react with the esterification agent, it is also possible to block such moieties with protective groups that can also be removed hydrolytically or hydrogenolytically after the esterification step. Finally, the thus-obtained sulfuric acid or phosphoric acid esters of the hydroxyflavanoids of Formula I can be converted, by treatment with bases, into the physiologically compatible salts thereof.

The hydroxy group(s) in the hydroxyflavanoids to be esterified can be of a phenolic character (for example in the 6-, 3'-, and/or 4'-position); however, it is also possible to esterify alcoholic hydroxy groups (for example, in the 3-, or 4-position or as a substituent on alkoxy groups), or the hydroxy groups in the 3-position of flavanols (I, $R_4$=O, double bond in the 2,3-position).

(The numbering system is that used for flavones, e.g., Hackh's Chemical Dictionary, 3rd edition, page 345, The Blakiston Company, Philadelphia, Toronto, 1950.)

Alkoxy groups in the residues $R_1$, $R_2$ and/or $R_5$ can be, for example, the following: methoxy, ethoxy, propoxy, isopropoxy, butoxy, isobutoxy, sec.-butoxy, tert.-butoxy, amyloxy, isoamyloxy, hexyloxy, isohexyloxy, heptyloxy, octyloxy, nonyloxy, and decyloxy. For the purposes of this invention the alkoxy groups also include alkyloxy having a double bonded carbon-to-carbon bond, alkoxy substituted by aryl, and alkyloxy wherein the alkyl is cycloalkyl, such as, for example, allyloxy, benzyloxy, and cyclopentyloxy or cyclohexyloxy, respectively. In addition, the above-mentioned groups can be substituted with basic, acidic, or neutral substituents, the substituents being preferably the following: amino; mono- and dialkylated amino wherein preferably 1 to 6 carbon atoms are present in the alkyl portions such as dimethylamino, diethylamino; pyrrolidino, piperidino, morpholino; carbalkoxy of up to 8 carbon atoms, such as carbomethoxy, carbethoxy, cyano; carboxamido; dialkylcarboxamido wherein preferably 1 to 6 carbon atoms are present in the alkyl portions such as dimethyl or diethyl carboxamido. Accordingly, particularly suitable are such substituted alkoxy groups as 2-dimethylaminoethoxy, 2-diethylaminoethoxy, 2-pyrrolidinoethoxy, 2-piperidinoethoxy, 2-morpholinoethoxy, 3-dimethylaminopropoxy, 3-diethylaminopropoxy, carboxymethoxy, carbalkoxymethoxy, such as carbomethoxymethoxy, carboethoxymethoxy, carbopropoxymethoxy, 2-carboxyethoxy, 3-carboxypropoxy, 4-carboxybutoxy, cyanomethoxy, 2-cyanoethoxy-, carboxamidoethoxy, mono- and dialkylcarboxamidomethoxy of a total of 2–7 carbon atoms, such as dimethylcarboxamidomethoxy, diethylcarboxamidomethoxy, pyrrolidinocarbonylmethoxy, piperidinocarbonylmethoxy, morpholinocarbonylmethoxy, (2-hydroxyethylamino)-carbonylmethoxy, 2-carboxamidoethoxy, 2-(dimethylcarboxamido)-ethoxy. In the above-mentioned residues, additional double bonds can also be present.

In case $R_1$, $R_2$ and/or $R_5$ represent acyloxy or acylamido groups, the acyl residues employed are preferably those derived from carboxylic acids of up to 6 carbon atoms, preferably formyl, acetyl, propionyl, butyryl, isobutyryl, valeryl, isovaleryl, caproyl, isocaproyl.

When $R_1$, $R_2$ and/or $R_5$ are amino groups, they can be mono- or dialkylated. The alkyl residues in one amino group can be of a total of up to 8 carbon atoms. Preferable groups are methyl, ethyl, n-propyl, isopropyl, n-butyl, isobutyl, amyl, hexyl, dimethyl, diethyl, di-n-propyl, diisopropyl, di-n-butyl, and/or diisobutylamino groups. The alkyl residues can also form, together with the nitrogen atom, a heterocyclic ring, for example a piperdine ring.

Alkyl groups in the residue $R_3$ are preferably methyl, ethyl, n-propyl, isopropyl, n-butyl, sec.-butyl, isobutyl, tert.-butyl, n-amyl, isoamyl, n-hexyl, and isohexyl; alkoxy groups are preferably methoxy, ethoxy, n-propoxy, isopropoxy, n-butoxy, sec.-butoxy, isobutoxy, tert.-butoxy, n-amyloxy, isoamyloxy, n-hexyloxy, and isohexyloxy.

It is particularly advantageous for the residue $R_1$ to represent the group $R_7$—CO—CHR$_6$—O—, wherein $R_6$ is H, or lower alkyl, such as methyl, ethyl, n-propyl, isopropyl, n-butyl, isobutyl, sec.-butyl, tert.-butyl, n-amyl, or isoamyl, and $R_7$ is OH, lower alkoxy, such as methoxy, ethoxy, n-propoxy, isopropoxy, n-butoxy, isobutoxy, sec.-butoxy, tert.-butoxy, n-amyloxy, isoamyloxy, n-hexyloxy, $NH_2$, or alkylated amino, such as methyl, ethyl, n-propyl, isopropyl, n-butyl, isobutyl, amyl, hexyl, heptyl, dimethyl, methylethyl, diethyl, di-n-propyl, diisopropylamino, 2-hydroxyethylamino, pyrrolidino, piperidino, or morpholino.

The starting substances of Formula I can be produced according to the method described in Belgian Patent No. 652,404.

Acid derivatives suitable for the reaction are, in addition to the free sulfuric and phosphoric acid, particularly sulfamic acid, chlorosulfonic acid, sulfur trioxide or the adducts thereof with dioxane; pyridine, dimethyl aniline, diethyl aniline, and other tertiary bases; polyphosphoric acid, phosphoric pentoxide, phosphorus oxychloride, monochlorophosphoric acid (a mixture of orthophosphoric acid and phosphorus oxychloride), phosphoric acid monobenzyl ester, phosphoric acid dibenzyl ester chloride, phosphoric acid mono-(2-cyanoethyl ester), phosphoric acid dimorpholide chloride.

The reaction of the hydroxyflavanoid of Formula I with the sulfuric acid or phosphoric acid derivative is preferably conducted in the presence of an additional solvent. In case an acid, for example hydrogen chloride, is split off during the reaction, preferred solvents are organic bases, such as pyridine, triethylamine, quinoline, dimethyl aniline, diethyl aniline. Alternatively, or in addition, inert organic solvents can be employed, such as, for example, ether, diisopropyl ether, tetrahydrofuran, dioxane, chloroform, methylene chloride, trichloroethylene, dimethyl formamide, dimethyl sulfoxide, benzene, toluene, xylene, tetralin, acetonitrile. Furthermore, mixtures of the abovementioned bases and/or solvents can be used. It is likewise possible to allow the reaction to take place in an excess of the sulfuric acid or phosphoric acid derivative.

The reaction temperatures range between $-80$ and $+200°$ C., preferably between $-10$ and $+100°$ C. Depending upon the reactant employed and the temperature used, the reaction is terminated after reaction periods ranging between 5 minutes and about 100 hours. The working-up operation is conducted in accordance with known methods of extraction, distillation, crystallization, or chromatography known from the literature. Quite generally, those methods can be used according to the invention for producing the sulfuric acid or phosphoric acid esters and the salts thereof which are described in the literature.

If desired, protecting groups present in the final products can be removed hydrolytically or hydrogenolytically. A hydrolytic removal of protecting groups can normally be accomplished by treatment with acids or bases. However, this process must be carried out under mild conditions so that the sulfuric acid or phosphoric acid ester bond formed according to the invention is not also split at the same time. For example, it is possible to liberate, by gently operating with dilute mineral acids, preferably hydrochloric or sulfuric acid, at room temperature, an amino group protected in the form of a Schiff base, without at the same time damaging the sulfuric acid ester bond. Likewise, protected hydroxy groups can be liberated by alkaline or gentle acidic hydrolysis, such hydroxy groups stemming either from the flavanoid component or preferably, from the sulfuric acid or phosphoric acid component of the esterification reaction. For example, if the esterification is carried out with phosphoric acid mono-(2-cyanoethyl ester), phosphoric acid diphenyl ester chloride, or phosphoric acid dimorpholide chloride, the thus-obtained phosphoric acid di- or triester or monoester diamides can be split with the aid of the suitable reactants, known from the literature. For example, there can be used alkali or ammonium hydroxide solutions, or basic or acidic ion exchangers, to form the desired flavanoid phosphoric acid esters.

A hydrogenolytic cleavage of protective groups, preferably benzyl groups, in phosphoric acid esters, is conducted, for example, by hydrogenation with a conventional hydrogenation catalyst. In this connection, care must be taken, of course, to avoid the hydrogenation of other hydrogenatable groups, or that the aromatic rings in the molecule are not hydrogenated. Therefore, this reaction is preferably conducted under gentle conditions, for example with a palladium catalyst, such as palladium on a support such as charcoal, calcium carbonate, or strontium carbonate, at room temperature and normal pressure. The hydrogenation should be abruptly terminated after the stoichiometric quantity of hydrogen has been absorbed.

The thus-obtained sulfuric acid or phosphoric acid esters can be converted into the respective physiologically compatible salts by treatment with a base. This reaction is normally conducted under cold conditions; the solvents being used in this connection are preferably water, lower alcohol, such as methanol, or ethanol, mixtures of water with lower alcohols, or the organic bases employed for the formation of the salt. Preferred bases are the hydroxides, carbonates, or alcoholates of the alkali or alkaline earth metals, as well as the corresponding ammonium compounds. It is particularly preferred to employ sodium, potassium, calcium, or magnesium hydroxide, sodium, potassium, calcium, or magnesium carbonate; sodium, potassium, calcium, or magnesium bicarbonate; sodium, potassium, calcium, or magnesium methylate, ethylate, isopropylate or tert.-butylate; ammonium hydroxide, ammonium carbonate or ammonium bicarbonate; substituted ammonium hydroxides, carbonates, or bicarbonates; and also organic bases, such as pyridine.

The preferred subgeneric groups are the sulfuric acid or phosphoric acid esters obtained from hydroxy-flavanoids of the following formulae (wherein at least one free hydroxy group must be present), and the physiologically compatible salts thereof:

(A) The compounds of Formula I wherein $R_1$ is limited to $R_7COCHR_6O-$ wherein:

$R_6$ is H or alkyl of 1–5 carbon atoms, and $R_7$ is OH, alkoxy of 1–6 carbon atoms, $NH_2$-alkylated amino of 1–8 carbon atoms, 2-hydroxyethylamino, pyrrolidino, piperidino, or morpholino, but wherein the residue $R_7COCHR_6$ has a total of at most 10 carbon atoms;

(B) The compounds of Formula I wherein:

$R_1$ is OH, alkoxy of 1–5 carbon atoms, or $R_7COCHR_6O-$ $R_2$ is OH, alkoxy of 1–5 carbon atoms or benzyloxy, $R_3$ is H, OH, alkyl or alkoxy of respectively 1–4 carbon atoms, $R_5$ is H or $CH_3O$, $R_3$ and $R_5$ together can also mean methylenedioxy;

(C) The compounds of Formula I wherein:

$R_1$ is OH, $R_2$ is OH or $CH_3O$, $R_3$ is H, alkyl or alkoxy of respectively 1–4 carbon atoms, $R_4$ is O or H, OH, or H, H, and $R_5$ is H, $CH_3O$, or, together with $R_2$, methylenedioxy.

It is preferred that the flavanoid be esterified with sulfuric or phosphoric acid in 1 to 4, preferably 1 to 2 positions. Mixed esters are also valuable.

The novel compounds can be employed with conventional pharmaceutical excipients. Carrier substances can be such organic or inorganic compounds suitable for parenteral, enteral, or topical application and which do not react with the novel compounds, such as, for example, water, vegetable oils, polyethylene glycols, gelatin, lactic sugar, amylose, magnesium stearate, talc, vaseline, etc. For parenteral application, particularly oily or aqueous solutions, as well as suspensions, emulsions, or implants are employed.

For enteral application, furthermore, suitable are tablets or dragées which are also characterized by the presence of a carbohydrate carrier or binder. A syrup or the like can also be used wherein a sweetened vehicle is employed.

For topical application salves or creams which can, if desired, be sterilized or mixed with auxiliary substances, such as preservatives, stabilizers, or wetting agents, or salts for influencing the osmotic pressure, or with buffer substances, are used. The substances of the invention are administered preferably in a dosage of 1 to 500 mg. per dosage unit. In such pharmaceutical compositions the carrier is usually present in an amount of 1 to 5000 mg.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

3.5 g. 3-methyl-6-hydroxy-4'-methoxyflavanone and 3.6 g. sulfamic acid are added, under stirring, to 14 ml. absolute pyridine at 90° C. After stirring for 3 hours at 90° C., the reaction solution is cooled, mixed with 100 ml. absolute ether, and vigorously agitated. The solution is decanted from the precipitate; the latter is washed with a small amount of ether, dried under vacuum, mixed with a mixture of 45 ml. 12% sodium hydroxide solution and 30 ml. pyridine, and well shaken. The upper pyridine layer is separated and washed several times with ether. The separated oil is dried under vacuum, then taken up in methanol, briefly treated with active charcoal, and concentrated by evaporation. From metanol ether, the sodium salt of 3-methyl-6-hydroxy-4' - methoxyflavanone-6 - sulfuric acid ester is crystallized, M.P. 145–165° C. (partial decomposition).

Analogously, the following compounds are obtained from the corresponding hydroxyflavanoids:

Sodium salt of 6-hydroxy-4'-methoxyflavane-6-sulfuric acid ester, M.P. 165–168° C. (decomposition);

Sodium salt of 3-methyl-6 - hydroxy-3',4'-methylenedioxyflavane-6-sulfuric acid ester, M.P. 162–168° C. (decomposition);

Disodium salt of 3-methyl-6,4'-dihydroxy-3'-methoxyflavanone-6,4'-bis-sulfuric acid ester, M.P. 164–173° C. (decomposition);

Sodium salt of 3-methyl-4'-hydroxyflavanone-6-oxyacetic acid-pyrrolidide-4'-sulfuric acid ester, M.P. 225–227° C.;

Sodium salt of 3-n-propyl-6-hydroxy-4'-methoxyflavanone-6-sulfuric acid ester, M.P. 150° C.;

Sodium salt of 3-n-propyl-6-hydroxy-3',4'-methylenedioxyflavanone-6-sulfuric acid ester, M.P. 100° C.;

Sodium salt of 3-n-butyl-6-hydroxy-4'-methoxyflavanone-6-sulfuric acid ester, M.P. 170–175° C.;

Sodium salt of 3-isobutyl-6-hydroxy-4'-methoxyflavanone-6-sulfuric acid ester, M.P. 165–170° C.;

Sodium salt of 3-isobutyl-6-hydroxy-3',4'-methylenedioxyflavanone-6-sulfuric acid ester, M.P. 100° C. (sintering at 70° C.);

Sodium salt of 3-methyl-3'-methoxy-4'-hydroxyflavanone-6-oxyacetic acid-pyrrolidide-4'-sulfuric acid ester, M.P. 130° C. (decomposition);

Sodium salt of 3-ethyl-6-hydroxy-3',4'-methylenedioxyflavanone-6-sulfuric acid ester, M.P. 160° C. (decomposition);

Sodium salt of 3-n-butyl-6-hydroxy-3',4'-methylenedioxyflavanone-6-sulfuric acid ester, M.P. 150–155° C. (decomposition).

EXAMPLE 2

To a solution of 4 g. of 3,4'-dimethoxy-6-hydoxyflavane in 40 ml. dry pyridine, cooled to −10° C., there is added, at −10° C., a solution of 2 g. chlorosulfonic acid in 20 ml. dry pyridine. After allowing the mixture to stand for 5 hours at room temperature, it is worked up as in Example 1. There is obtained 3,4'-dimethoxy-6-hydroxyflavane-6-sulfuric ester in the form of its sodium salt, M.P. 150–153° C. (decomposition; methanol/ether).

EXAMPLE 3

A solution of 3.9 g. 3-methyl-6-hydroxy-4'-methoxyflavane in 17 ml. dry pyridine is mixed with a 10% excess of pyridine-sulfur-trioxide-adduct and stirred overnight at room temperature. The crude pyridinium salt precipitating by the addition of 170 ml. ether is separated, washed with a small quantity of ether, dried, dissolved in 30 ml. absoulte methanol, adjusted to a pH of 10 with sodium methylate, and allowed to stand overnight at room temperature. Then, charcoal is added and the mixture is filtered; the filtrate is concentrated to 15–20 ml. and mixed with eight times as much ether. The precipitated 3-methyl-6-hydroxy-4'-methoxyflavane-6-sulfuric acid ester sodium salt is filtered off and recrystallized from metanol; M.P. 115–120° C. (decomposition).

EXAMPLE 4

3.7 g. 3-ethyl-6-hydroxy-4'-methoxyflavanone are reacted with 3.6 g. sulfamic acid analogously to Example 1. The isolated and dried pyridinium salt of the sulfuric acid ester is dissolved in 1 mol ammonium hydroxide, and thus-produced ammonium salt is extracted with n-butanol. After the solvent has been distilled off, the ammonium salt of 3-ethyl-6-hydroxy-4'-methoxyflavanone - 6-sulfuric acid ester is recrystallized from methanol.

EXAMPLE 5

A solution of 3.5 g. 3-methyl-4,6-dihydroxy-4'-methoxyflavane in 28 ml. pyridine is mixed at 90° C. with 7.2 g. sulfamic acid and stirred for 3 hours at this temperature. The conductance of a working-up process according to Example 1 results in the disodium salt of 3-methyl-4,6-dihydroxy-4'-methoxyflavane-4,6-bis - sulfuric acid ester, M.P. 175–180° C. (decomposition).

EXAMPLE 6

A solution of 2.8 g. 3-methyl-6-hydroxy-4'-methoxyflavane in 50 ml. absolute pyridine is added to a solution of 10 ml. phosphorus oxychloride in 100 ml. pyridine at 0° C. and within 10 minutes. After allowing the mixture to stand for 15 hours, it is stirred into a mixture of 1.5 l. ice and 150 ml. concentrated hydrochloric acid, heated on a steam bath for one hour, cooled, and extracted with ethyl acetate. The extract is washed with 1 N hydrochloric acid and dried over sodium sulfate. After concentrating, there crystallizes the 3-methyl-6-hydroxy-4'-methoxyflavane-6-phosphoric acid ester, M.P. 178–181° C. By gently neutralizing the aqueous solution with a potassium carbonate solution and subsequent freeze-drying, the dipotassium salt is obtained.

EXAMPLE 7

A solution of 2 g. 3,4-dimethoxy-6-hydroxyflavane in 20 ml. absolute pyridine is mixed at −25° C. with 10 ml. of a solution of 7 g. phosphoric acid dibenzyl ester chloride in absolute ether, stirred for one hour at −25° C., and left standing overnight at −5° C. The reaction mixture is stirred into ice water, made acidic with hdyrochloric acid to a pH of 4, extracted with ether, and dried over sodium sulfate. The residue obtained from the ether solution is dissolved in 100 ml. methanol. After the addition of 180 mg. palladium charcoal, hydrogen is introduced for about 8 minutes; then, the catalyst is filtered off and the reaction mixture is concentrated by evaporation. The 3,4'-dimethoxy-6-hydroxyflavane-6-phosphoric acid ester is obtained, M.P. 158–160° C. (methanol).

EXAMPLE 8

11.3 g. phosphoric acid monobenzyl ester are dissolved in 50 ml. dry pyridine, and 6.3 g. freshly prepared dimethylformamide chloride, as well as 1.35 g. 3-methyl-6-hydroxy-4'-methoxyflavane are added thereto. The mixture is stirred for 2 hours, allowed to stand overnight, then stirred into ice water, acidified to a pH of 4 with hydrochloric acid, and extracted with ether. The residue obtained from the ether solution is hydrogenated, as in Example 7, on palladium charcoal so that the 3-methyl-6-hydroxy-4'-methoxyflavane-6-phosphoric acid ester is obtained, M.P. 178–181° C. (ethyl acetate).

EXAMPLE 9

2 ml. phosphoric acid are made anhydrous by heating at 150° C. under vacuum; then cooled to −20° C., together with 17 ml. acetonitrile and 5 ml. triethylamine; mixed with 3.6 ml. chloroformic acid ethyl ester in 4 ml. acetonitrile; and stirred for 15 minutes. Thereupon, a solution of 2.5 g. 6-hydroxy-4'-methoxyflavane in 12 ml. acetonitrile and subsequently 4.8 ml. triethylamine are added under stirring. After there is no further development of gas, the mixture is boiled for one hour with stirring. After a working-up process has been conducted analogously to Example 7, there is obtained the 6-hydroxy-4'-methoxyflavane-6-phosphoric acid ester, M.P. 156–158° C. (ethyl acetate).

EXAMPLE 10

An ethereal solution of monochlorophosphoric acid, obtained by treating 10.2 g. 85% phosphoric acid with 9.4 g. phosphorus oxychloride, is added at −10° C. to a solution of 2 g. 6-hydroxy-4'-methoxyflavanone in 20 ml. absolute pyridine. After allowing the mixture to stand for 15 hours, it is worked up as in Example 7. 6-hydroxy-4'-methoxyflavanone-6-phosphoric acid ester is obtained, M.P. 128–130° C. (methanol).

EXAMPLE 11

3.56 g. 3-methyl-6-hydroxy-4'-methoxyflavane are dissolved in 400 ml. dry pyridine, mixed with 0.02 mol 2-cyanoethyl phosphate and 16.5 g. N,N'-dicyclohexylcarbodiimide, and allowed to stand at room temperature for 24 hours. After the addition of 50 ml. water, the mixture is stored for two days at 0° C. and then concentrated under vacuum. The residue is suspended in 50% methanol, treated for one hour at room temperature with 80 ml. 5% solution of sodium hydroxide, and is then adjusted to a pH of 4 with dilute hydrochloric acid; the dicyclohexyl urea which separates is filtered off. The filtrate is extracted with ethyl acetate; the extract is washed with 1 N hydrochloric acid and dried over sodium sulfate. After concentration of the extract, the 3-methyl-6-hydroxy-4'-methoxyflavane-6-phosphoric acid ester is obtained, M.P. 178–181° C.

EXAMPLE 12

A mixture of 0.54 g. 4-hydroxy-6-methoxy-4'-aminoflavane (obtainable by catalytic hydrogenation of 6-methoxy-4'-nitroflavanone), 0.196 g. crystallized orthophosphoric acid and 0.4 g. triethylamine is mixed, after several minutes, with 2 ml. trichloroacetonitrile and subsequently heated for four hours to 75° C. The mixture is cooled, the excess trichloroacetonitrile is removed under vacuum, and water and ether are added. Then, the mixture is separated and the aqueous layer is mixed with cyclohexylamine. After concentrating the reaction mixutre, there is obtained the monocyclohexylammonium salt of 4-hydroxy-6-methoxy-4'-aminoflavane-4-phosphoric acid ester. By adding the stoichiometric quantity of sodium hydroxide solution to an aqueous solution of the salt, extraction with ether, and concentration of hte aqueous phase, the corresponding monosodium salt can be produced.

EXAMPLE 13

Analogously to Example 1, there are obtained from the corresponding hydroxyflavanoids the sodium salts (or disodium salts) of the following 3- or 6-sulfuric acid esters (or 4,6-disulfuric acid esters):

6-hydroxy-4'-methoxyflavanone-,
6-hydroxy-4'-isobutoxyflavanone-,
6-hydroxy-4'-(2-dimethylaminoethoxy)-flavanone-,
6-hydroxy-4'-dimethylaminoflavanone-,
6-hydroxy-4'-benzyloxyflavanone-,
3-n-hexyl-6-hydroxy-4'-acetamidoflavanone-,
3,4'-dimethoxy-6-hydroxyflavanone-,
3-ethoxy-6-hydroxy-4'-methoxyflavanone-,
3-isohexyloxy-6-hydroxy-4'-di-n-butylaminoflavanone-,
6-hydroxy-3',4'-methylenedioxy-flavanone-,
6-hydroxy-3',4'-ethylenedioxyflavanone-,
6-hydroxy-3',4'-propylenedioxyflavanone,-
3-methoxy-6-hydroxy-3',4'-methylenedioxyflavanone-,
3-ethoxy-6-hydroxy-3',4'-methylenedioxyflavanone-,
3-bromo-6-hydroxy-4'-(3-morpholinopropoxy)-flavanone,
3-ethyl-6-hydroxy-4'-methoxyflavane-,
3-ethoxy-6-hydroxy-4'-methoxyflavane-,
6-hydroxy-3',4'-methylenedioxyflavane-,
3-ethyl-6-hydroxy-3',4'-methylenedioxyflavane-,
3-methoxy-6-hydroxy-3',4'-methylenedioxyflavane-,
3-ethoxy-6-hydroxy-3',4'-methylenedioxyflavane-,
3-methyl-6-hydroxy-4'-methoxyflavone-6-sulfuric acid ester, 4-hydroxy-6-decyloxy-4'-isoamyloxyflavane-4-sulfuric acid ester,
6-acetoxy-4'-nitroflavonol-3-sulfuric acid ester,
4,6-dihydroxy-4'-methoxyflavane-,
3-ethyl-4,6-dihydroxy-4'-methoxyflavane-,
3,4'-dimethoxy-4,6-dihydroxyflavane-,
3-ethoxy-4,6-dihydroxy-4'-methoxyflavane-,
4,6-dihydroxy-3',4'-methylenedioxyflavane-,
3-methyl-4,6-dihydroxy-3',4'-methylenedioxyflavane-,
3-ethyl-4,6-dihydroxy-3',4'-methylenedioxyflavane-,
3-methoxy-4,6-dihydroxy-3',4'-methylenedioxyflavane,
3-ethoxy-4,6-dihydroxy-3',4'-methylenedioxyflavane-4,6-bis-sulfuric acid ester.

EXAMPLE 14

Analogously to Example 6, the following 6-phosphoric acid esters (or the 4,6-diphosphoric acid esters) are obtained from the corresponding hydroxyflavanoids:

3-ethyl-6-hydroxy-4'-methoxyflavanone-,
3,4'-dimethoxy-6-hydroxyflavanone-,
3-ethoxy-6-hydroxy-4'-methoxyflavanone-,
6-hydroxy-3',4'-methylenedioxyflavanone-,
3-methyl-6-hydroxy-3',4'-methylenedioxyflavanone-,
3-ethyl-6-hydroxy-3',4'-methylenedioxyflavanone,
3-methoxy-6-hydroxy-3',4'-methylenedioxyflavanone-,
3-ethoxy-6-hydroxy-3',4'-methylenedioxyflavanone-,
3-ethyl-6-hydroxy-4'-methoxyflavane-,
3-ethoxy-6-hydroxy-4'-methoxyflavane-,
6-hydroxy-3',4'-methylenedioxyflavane-,
3-methyl-6-hydroxy-3',4'-methylenedioxyflavane-,
3-ethyl-6-hydroxy-3',4'-methylenedioxyflavane-,
3-methoxy-6-hydroxy-3',4'-methylenedioxyflavane-,
3-ethoxy-6-hydroxy-3',4'-methylenedioxyflavane-,
3-methyl-6-hydroxy-4'-methoxy-flavone-6-phosphoric acid ester,
4,6-dihydroxy-4'-methoxyflavane-,
3-methyl-4,6-dihydroxy-4'-methoxyflavane-,
3-ethyl-4,6-dihydroxy-4'-methoxyflavane-,
3,4'-dimethoxy-4,6-dihydroxyflavane-,
3-ethoxy-4,6-dihydroxy-4'-methoxyflavane-,
4,6-dihydroxy-3',4'-methylenedioxyflavane-,
3-methyl-4,6-dihydroxy-3',4'-methylenedioxyflavane-,
3-ethyl-4,6-dihydroxy-3',4'-methylenedioxyflavane-,
3-methoxy-4,6-dihydroxy-3',4'-methylenedioxyflavane-,
3-ethoxy-4,6-dihydroxy-3',4'-methylenedioxyflavane-4,6-bis-phosphoric acid ester.

The following examples cover suitable pharmaceutical compositions which can be prepared according to conventional procedures.

Example A.—Tablets

| | Mg. |
|---|---|
| 3-n-propyl-6-hydroxy-4'-methoxyflavanone-6 - sulfuric acid ester, sodium salt | 10 |
| Lactose | 60 |
| Cornstarch | 20 |
| Talc | 8 |
| Magnesium stearate | 2 |

Example B.—Coated tablets

| | Mg. |
|---|---|
| 3-methyl-6-hydroxy-4'-methoxyflavone - 6 - sulfuric acid ester, sodium salt | 12 |
| Lactose | 83 |
| Talc | 5 |

The coating consists of a mixture of cane sugar, talc, cornstarch, and tragacanth. Its weight is about 100 mg.

Example C.—Solution for injection

A solution of 2 kg. of 3-methyl-6-hydroxy-4'-methoxyflavane-6-sulfuric acid ester sodium salt in 998 l. of distilled water is prepared and filled into ampoules in such a manner that each ampoule contains 2 mg. of said sodium salt.

Example D.—Syrup

A mixture of

| | Kg. |
|---|---|
| 3,4'-dimethoxy-6-hydroxyflavane-6-phosphoric acid ester | 0.2 |
| Glycerol (twice distilled) | 7.5 |
| Cane sugar | 58 |
| Methyl-p-hydroxybenzoate | 0.07 |
| n-Propyl-p-hydroxybenzoate | 0.03 |
| Fruit flavorings, as desired. | | is dissolved in distilled water in such a manner that the volume of the entire preparation is 100 l. A dosage unit (5 ml.) contains 10 mg. of active substance.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be within the full range of equivalence of the following claims.

What is claimed is:

1. A compound selected from the group consisting of an ester of a hydroxy-containing flavanoid derivative, and a salt thereof, said ester being selected from the group consisting of a sulfuric acid ester and a phosphoric acid ester, the hydroxy-containing flavanoid derivative portion of said ester having the formula prior to esterification of

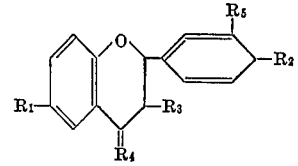

wherein
$R_1$ and $R_2$ each represents OH; unsubstituted alkoxy of 1–10 carbon atoms; alkoxy of 1–10 carbon atoms substituted by a member selected from the group consisting of amino, alkylated amino, pyrrolidino, piperidino, morpholino; carboxy; carbalkoxy, cyano, carboxamido, and dialkylcarboxamido; carboxylic acid acyloxy of 1–6 carbon atoms; $NO_2$, $NH_2$ alkylated $NH_2$ of 1–8 carbon atoms, carboxylic acid or acylamino of 2–6 carbon atoms;
$R_3$ represents H, OH, alkyl or 1–6 carbon atoms, alkoxy of 1–6 carbon atoms, $NH_2$, Cl, Br, or I;
$R_4$ represents O; H, OH; H, H; or H, $NH_2$;
$R_5$ represents H, $R_1$, or together with $R_2$ methylenedioxy, ethylenedioxy or propylenedioxy;
wherein in the 2,3-position a double bond is optionally present; and with the provision that $R_1$ to $R_5$ represents at least one free hydroxy group.

2. A compound as defined by claim 1 wherein said ester is the sulfuric acid ester.

3. A compound as defined by claim 1 wherein said ester is the phosphoric acid ester.

4. A compound as defined by claim 1 wherein said compound is 3-methyl-6-hydroxy-4'-methoxyflavanone-6-sulfuric acid ester.

5. A compound as defined by claim 1 wherein said compound is 3-ethyl-6-hydroxy-4'-methoxyflavanone-6-sulfuric acid ester.

6. A compound as defined by claim 1 wherein said compound is 3-isobutyl-6-hydroxy-4'-methoxyflavanone-6-sulfuric acid ester.

7. A compound as defined by claim 1 wherein said compound is 3-methyl-6-hydroxy-3',4'-methylenedioxyflavanone-6-sulfuric acid ester.

8. A compound as defined by claim 1 wherein said compound is 3-ethyl-6-hydroxy-3',4'-methylenedioxyflavanone-6-sulfuric acid ester.

9. A compound as defined by claim 1 wherein said compound is 3,4'-dimethoxy-6-hydroxyflavane-6-sulfuric acid ester.

10. A compound as defined by claim 1 wherein said compound is 3-methyl-6-hydroxy-3',4'-methylenedioxyflavane-6-sulfuric acid ester.

11. A compound as defined by claim 1 wherein said compound is 3-methyl-6-hydroxy-4'-methoxyflavanone-6-phosphoric acid ester.

12. A compound as defined by claim 1 wherein said compound is 3-methyl-6-hydroxy-4'-methoxyflavanone-6-phosphoric acid ester.

13. A compound as defined by claim 1 wherein $R_3$ is other than hydrogen.

14. A compound as defined by claim 13 wherein said ester is the phosphoric acid ester.

References Cited

Row et al.: I. Indian Chem. Soc., vol. 40, pp. 521–4 (1953).

Christian et al.: Chemische Berichte, vol. 90, pp. 1287–9 (1957).

Fischer et al.: Chemische Berichte, vol. 97, pp. 1910–14 (1964).

Row et al.: Current Sci. (India), vol. 25, pp. 393–4 (1956).

Raval et al.: J. Org. Chem., vol. 21, pp. 1408–11 (1956).

Iorio et al.: Chemical Abstracts, vol. 52, col. 20042h (1958).

HENRY R. JILES, *Primary Examiner.*

JOHN M. FORD, *Assistant Examiner.*

U.S. Cl. X.R.

260—345.2, 340.3, 247.2, 247.5, 247.7, 294, 294.7, 326.3, 326.5, 999

UNITED STATES PATENT OFFICE
CERTIFICATE OF CORRECTION

Patent No. 3,433,805            March 18, 1969

Josef Krämer et al.

It is certified that error appears in the above identified patent and that said Letters Patent are hereby corrected as shown below:

Column 11, line 16, "methoxyflavanone" should read -- methoxyflavane --.

Signed and sealed this 7th day of April 1970.

(SEAL)
Attest:

Edward M. Fletcher, Jr.

Attesting Officer

WILLIAM E. SCHUYLER, JR.

Commissioner of Patents